United States Patent
Matsuda et al.

(10) Patent No.: US 7,233,707 B2
(45) Date of Patent: Jun. 19, 2007

(54) IMAGE PROCESSING SYSTEM, PROJECTOR, PROGRAM, INFORMATION STORAGE MEDIUM, AND IMAGE PROCESSING METHOD

(75) Inventors: Hideki Matsuda, Fujimi-machi (JP); Tetsuro Tokuyama, Oita (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 11/137,350

(22) Filed: May 26, 2005

(65) Prior Publication Data
US 2005/0265713 A1 Dec. 1, 2005

(30) Foreign Application Priority Data
May 26, 2004 (JP) .............................. 2004-156273

(51) Int. Cl.
*G03B 21/14* (2006.01)
(52) U.S. Cl. ...................... 382/275; 382/260; 382/268; 382/274; 382/289; 348/744; 353/69; 353/121
(58) Field of Classification Search ................ 362/257; 353/34, 82, 30; 396/429, 430, 439; 382/181, 382/274
See application file for complete search history.

(56) References Cited

U.S. PATENT DOCUMENTS 5,532,765 A * 7/1996 Inoue et al. ................. 348/807
6,323,965 B1 11/2001 Kodan
6,939,011 B2 * 9/2005 Kobayashi .................... 353/69
2001/0010514 A1 * 8/2001 Ishino ........................ 345/158
2003/0058252 A1 3/2003 Matsuda et al.
2003/0147053 A1 * 8/2003 Matsuda et al. .............. 353/31
2005/0041967 A1 * 2/2005 King et al. ................. 396/429
2007/0003275 A1 * 1/2007 Silverbrook ................ 396/429

FOREIGN PATENT DOCUMENTS

| EP | 1 349 387 A2 | 10/2003 |
|----|---|---|
| EP | 1 363 462 A2 | 11/2003 |
| JP | A-2001-268326 | 9/2001 |
| JP | A-2004-228948 | 8/2004 |

* cited by examiner

*Primary Examiner*—David Bruce
*Assistant Examiner*—Nia Cook
(74) *Attorney, Agent, or Firm*—Oliff & Berridge, PLC

(57) ABSTRACT

A projector includes a projection section which projects an all-white image and an all-black image onto a screen, a sensor which generates first sensing information by sensing the all-white image and generates second sensing information by sensing the all-black image, a differential image generation section which generates a differential image based on the first and second sensing information, an external light effect removal section, and a projection target area detection section which generates projection target area information on the position of a projection target area corresponding to the screen in the sensing area of the sensor based on the differential image from which the external light effect is removed.

11 Claims, 12 Drawing Sheets

IMAGE PROCESSING SYSTEM, PROJECTOR, PROGRAM, INFORMATION STORAGE MEDIUM, AND IMAGE PROCESSING METHOD

Japanese Patent Application No. 2004-156273, filed on May 26, 2004, is hereby incorporated by reference in its entirety.

BACKGROUND OF THE INVENTION

The present invention relates to an image processing system, a projector, a program, an information storage medium, and an image processing method that detect a predetermined area based on sensing information.

In recent years, a method of adjusting the position of a projected image by projecting an image onto a projection target such as a screen using a projector including a CCD camera, sensing the projected image using the CCD camera, and detecting the coordinates of four corners of the projection area in the sensing area has been proposed.

In this case, if external light which causes a strong contrast, such as sunlight entering through a window shade, is reflected on the screen, the external light may be judged as an edge or a part of a shape during edge detection or shape detection.

To deal with this problem, Japanese Patent Application Laid-open No. 2001-268326 proposes an image processing device which removes the effect of external light components on a sensed image.

However, the effect of external light which causes a strong contrast cannot be removed by utilizing a method using a general differential image as that of the image processing device disclosed in Japanese Patent Application Laid-open No. 2001-268326. This is because the sensed image becomes saturated due to the addition of the effect of external light to the projection light.

The image processing device disclosed in Japanese Patent Application Laid-open No. 2001-268326 aims at removing the effect of external light after edge detection based on external light information near the edge or the like. However, since the edge due to external light which causes a strong contrast differs to a large extent from the area near the edge, the effect of external light cannot be appropriately removed by using this method.

The image processing device disclosed in Japanese Patent Application Laid-open No. 2001-268326 performs processing by obtaining the exposure. However, since the exposure is determined based on the average brightness of the entire image, the effect cannot be appropriately judged when a strong contrast occurs on a part of an image due to external light.

In the case where a projector projects an image onto a screen or the like, it is preferable that distortion of the projected image be corrected respective of the inclusion relationship between the projected image and the screen, even when the effect of external light occurs.

SUMMARY

A first aspect of the present invention relates to an image processing system, comprising;

projection section which projects a first calibration image or planar light and a second calibration image or planar light onto a projection target;

sensing section which generates first sensing information by sensing the projection target onto which the first calibration image or the planar light is projected, and generating second sensing information by sensing the projection target onto which the second calibration image or the planar light is projected;

differential image generation section which generates a first differential image which is a difference between a first sensed image indicated by the first sensing information and a second sensed image indicated by the second sensing information;

external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed, and projection target area detection section which generates projection target area information on a position of a projection target area corresponding to the projection target in a sensing area of the sensing section by performing the edge detection processing based on the first differential image subjected to the processing by the external light effect removal section.

A second aspect of the invention relates to an image processing system, comprising:

projection section which projects a first calibration image or planar light onto a projection target;

sensing section which generates first sensing information by sensing the projection target onto which the first calibration image or the planar light is projected, and generating second sensing information by sensing the projection target onto which an image or light is not projected;

differential image generation section which generates a first differential image which is a difference between a first sensed image indicated by the first sensing information and a second sensed image indicated by the second sensing information;

external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the fist differential image so that edge detection processing is not performed; and projection target area detection section which generates projection target area information on a position of a projection target area corresponding to the projection target in a sensing area of the sensing section by performing the edge detection processing based on the first differential image subjected to the processing by the external light effect removal section.

A third aspect of the invention relates to a projector comprising:

projection section which projects a first calibration image or planar light and a second calibration image or planar light onto a projection target;

sensing section which generates first sensing information by sensing the projection target onto which the first calibration image or the planar light is projected, and generating second sensing information by sensing the projection target onto which the second calibration image or the planar light is projected;

differential image generation section which generates a first differential image which is a difference between a first sensed image indicated by the first sensing information and a second sensed image indicated by the second sensing information;

external light effect removal section which performs, when a pixel area having a brightness index value equal to or greater than a predetermined value exists in the fast or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and projection target area detection section which generates projection target area information on a position of a projection target area corresponding to the projection target in a sensing area of the sensing section by performing the edge detection processing based on the fist differential image subjected to the processing by the external light effect removal section.

A fourth aspect of the invention relates to a program causing a computer to function as:

projection section which projects a first calibration image or planar light and a second calibration image or planar light onto a projection target;

sensing section which generates first sensing information by sensing the projection target onto which the first calibration image or the planar light is projected, and generating second sensing information by sensing the projection target onto which the second calibration image or the planar light is projected;

differential image generation section which generates a fist differential image which is a difference between a first sensed image indicated by the first sensing information and a second sensed image indicated by the second sensing information;

external light effect removal section which performs, when a pixel area having a brightness index value equal to or eater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel a=ea in the first differential image so that edge detection processing is not performed; and projection target area detection section which generates projection target area information on a position of a projection target area corresponding to the projection target in a sensing area of the sensing section by performing the edge detection processing based on the first differential image subjected to the processing by the external light effect removal section.

A fifth aspect of the invention relates to an information storage medium which stores the above program.

A sixth aspect of the invention relates to an image processing method comprising:

projecting a first calibration image or planar light onto a projection target;

generating first sensing information by sensing the projection target onto which the first calibration image or the planar light is projected;

projecting a second calibration image or the planar light onto the projection target;

generating second sensing information by sensing the projection target onto which the second calibration image or the planar light is projected;

generating a first differential image which is a difference between a first sensed image indicated by the first sensing information and a second sensed image indicated by the second sensing information;

performing, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and generating projection target area information on a position of a projection target area corresponding to the projection target in a sensing area by performing the edge detection processing based on the first differential image subjected to the processing.

DETAILED DESCRIPTION OF THE EMBODIMENT

Figure 1:
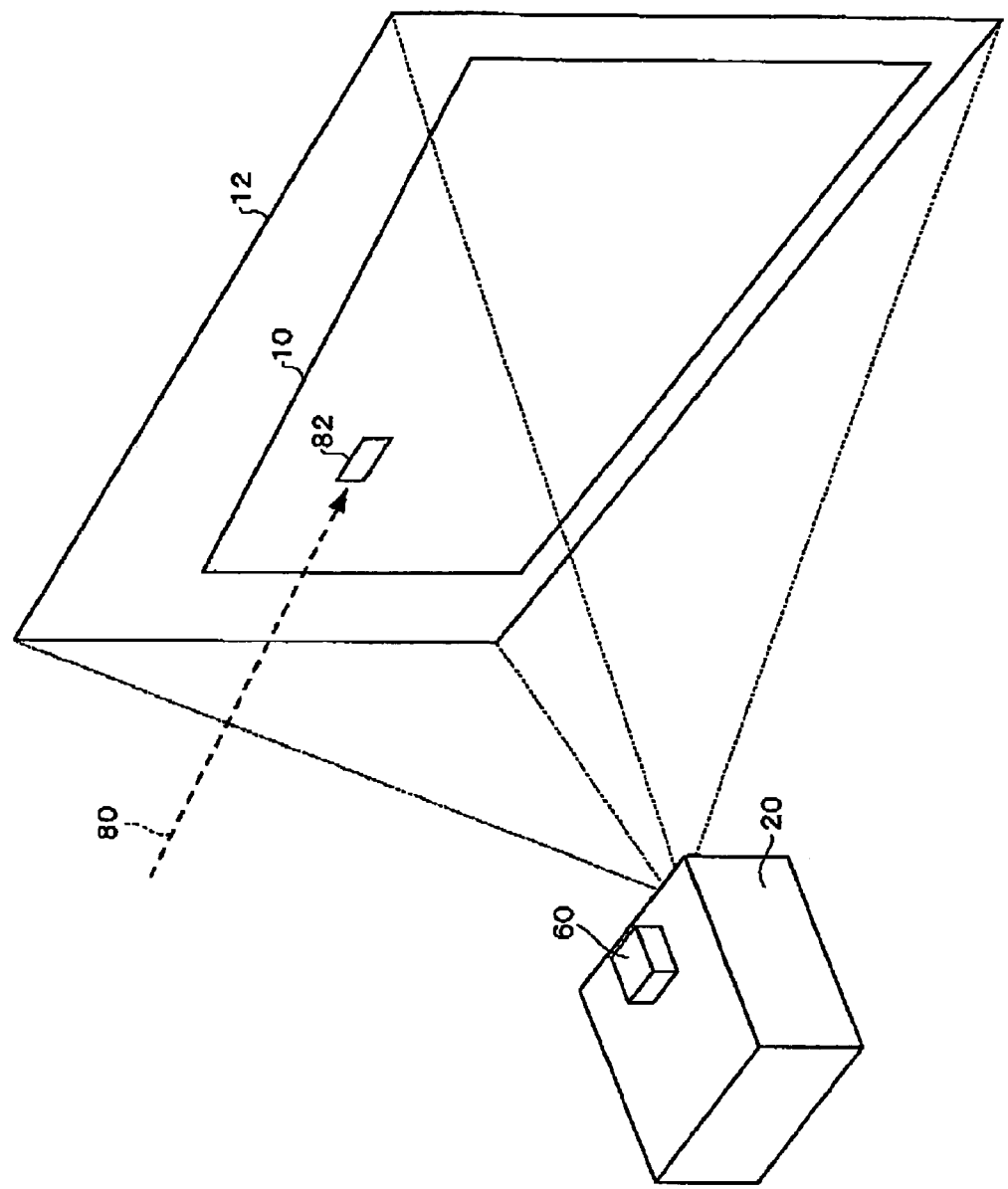
FIG. 1 is a schematic diagram showing an image projection state according to an embodiment of the present invention.

The present invention may provide an image processing system, a projector, a program, an information storage medium, and an image processing method capable of appropriately detecting a predetermined area in a sensed image while reducing the effect of external light included in the sensed image.

An image processing system and a projector according to embodiments of the invention comprise:

projection section which projects a first calibration image or planar light and a second calibration image or planar light onto a projection target;

sensing section which generates first sensing information by sensing the projection target onto which the first calibration image or the planar light is projected, and generating second sensing information by sensing the projection target onto which the second calibration image or the planar light is projected;

differential image generation section which generates a first differential image which is a difference between a first sensed image indicated by the first sensing information and a second sensed image indicated by the second sensing information;

external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and projection target area detection section which generates projection target area information on a position of a projection target area corresponding to the projection target in a sensing area of the sensing section by performing the edge detection processing based on the first differential image subjected to the processing by the external light effect removal section.

A program according to an embodiment of the invention causes a computer to function as:

projection section which projects a first calibration image or planar light and a second calibration image or planar light onto a projection target;

sensing section which generates first sensing information by sensing the projection target onto which the first calibration image or the planar light is projected, and generating second sensing information by sensing the projection target onto which the second calibration image or the planar light is projected;

differential image generation section which generates a first differential image which is a difference between a first sensed image indicated by the first sensing information and a second sensed image indicated by the second sensing information;

external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the fist differential image, or processing of setting a special value as the brightness index value of the pixel area in the first differential image so that edge detection processing is not performed; and projection target area detection section which generates projection target area information on a position of a projection target area corresponding to the projection target in a sensing area of the sensing section by performing the edge detection processing based on the first differential image subjected to the processing by the external light effect removal section.

An image processing method according to an embodiment of the invention comprises:

projecting a first calibration image or planar light onto a projection target;

generating first sensing information by sensing the projection target onto which the first calibration image or the planar light is projected;

projecting a second calibration image or the planar light onto the projection target;

generating second sensing information by sensing the projection target onto which the second calibration image or the planar light is projected;

generating a first differential image which is a difference between a first sensed image indicated by the first sensing information and a second sensed image indicated by the second sensing information;

performing, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and generating projection target area information on a position of a projection target area corresponding to the projection target in a sensing area by performing the edge detection processing based on the first differential image subjected to the processing.

An image processing system and a projector according to embodiments of the invention comprise:

projection section which projects a first calibration image or planar light onto a projection target;

sensing section which generates first sensing information by sensing the projection target onto which the first calibration image or the planar light is projected, and generating second sensing information by sensing the projection target onto which an image or light is not projected;

differential image generation section which generates a first differential image which is a difference between a first sensed image indicated by the first sensing information and a second sensed image indicated by the second sensing information;

external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and projection target area detection section which generates projection target area information on a position of a projection target area corresponding to the projection target in a sensing area of the sensing section by performing the edge detection processing based on the first differential image subjected to the processing by the external light effect removal section.

A program according to an embodiment of the invention causes a computer to function as:

projection section which projects a first calibration image or planar light onto a projection target;

sensing section which generates fist sensing information by sensing the projection target onto which the first calibration image or the planar light is projected, and generating second sensing information by sensing the projection target onto which an image or light is not projected;

differential image generation section which generates a first differential image which is a difference between a first sensed image indicated by the first sensing information and a second sensed image indicated by the second sensing information;

external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and projection target area detection section which generates projection target area information on a position of a projection target area corresponding to the projection target in a sensing area of the sensing section by performing the edge detection processing based on the first differential image subjected to the processing by the external light effect removal section.

An information storage medium according to an embodiment of the invention stores any one of the above programs.

An image processing method according to an embodiment of the invention comprises:

projecting a first calibration image or planar light onto a projection target;

generating first sensing information by sensing the projection target onto which the first calibration image or the planar light is projected;

generating second sensing information by sensing the projection target onto which an image or light is not projected;

generating a first differential image which is a difference between a first sensed image indicated by the first sensing information and a second sensed image indicated by the second sensing information;

performing, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and generating projection target area information on a position of a projection target area corresponding to the projection target in a sensing area by performing the edge detection processing based on the first differential image subjected to the processing.

The image processing system and the like according to the embodiments of the invention can appropriately detect the projection target area in the sensed image in a state in which the effect of external light which causes a strong contrast is removed by performing a processing to remove the external light effect.

The image processing system and the like according to the embodiments of the invention can detect the projection target area with higher accuracy by detecting the projection target area by performing edge detection and the like for the differential image from which the external light effect is removed.

The first calibration image may be an image of which the entire image is white, and the second calibration image may be an image of which the entire image is black.

As the brightness index value, a value which is an index of brightness such as a luminance value or RGB signal values can be given.

The differential image between the first calibration image or the planar light and the second calibration image or the planar light may be an image which does not include a high-frequency component.

According to this feature, the image processing system and the like can perform highly accurate area detection in which erroneous detection rarely occurs.

The image processing system and the projector of the embodiments of the invention may comprise:

projection area detection section which generates projection area information on a position of a projection area in the sensing area of the sensing section, the projection section may project a third calibration image onto the projection target, the sensing section may sense the projection target onto which the third calibration image is projected and may generate third sensing information, the differential image generation section may generate a second differential image which is a difference between the first sensed image and a third sensed image indicated by the third sensing information, the second differential image may include a center block area located in a center portion of the differential image, a peripheral block area located in a periphery of the center block area, and a background area which is an area other than the center block area and the peripheral block area, each pixel in the center block area and the peripheral block area may have a brightness index value differing from a brightness index value of each pixel in the background area, and the projection area detection section may include:

center reference position detection section which detects a plurality of center reference positions of the center block area in the sensing area of the sensing section based on the second differential image;

peripheral reference position detection section which detects a plurality of peripheral reference positions of the peripheral block area in the sensing area based on the center reference positions; and projection area information generation section which generates the projection area information based on the center reference positions and the peripheral reference positions.

The program and the information storage medium of the embodiments of the invention may cause the computer to function as:

projection area detection section which generates projection area information on a position of a projection area in the sensing area of the sensing section, the projection section may project a third calibration image onto the projection target, the sensing section may sense the projection tart onto which the third calibration image is projected and may generate third sensing information, the differential image generation section may generate a second differential image which is a difference between the first sensed image and a third sensed image indicated by the third sensing information, the second differential image may include a center block area located in a center portion of the differential image, a peripheral block area located in a periphery of the center block area, and a background area which is an area other than the center block area and the peripheral block area, each pixel in the center block area and the peripheral block area may have a brightness index value differing from a brightness index value of each pixel in the background area, and the projection area detection section may include:

center reference position detection section which detects a plurality of center reference positions of the center block area in the sensing area of the sensing section based on the second differential image;

peripheral reference position detection section which detects a plurality of peripheral reference positions of the peripheral block area in the sensing area based on the center reference positions; and projection area information generation section which generates the projection area information based on the center reference positions and the peripheral reference positions.

The image processing method of the embodiment of the invention may comprise:

projecting a third calibration image onto the projection target;

sensing the projection target onto which the third calibration image is projected and generating third sensing information; and generating a second differential image which is a difference between the fist sensed image and a third sensed image indicated by the third sensing information, the second differential image may include a center block area located in a center portion of the differential image, a peripheral block area located in a periphery of the center block area, and a background area which is an area other than the center block area and the peripheral block area, each pixel in the center block area and the peripheral block area may have a brightness index value differing from a brightness index value of each pixel in the background area, and the method may further include:

detecting a plurality of center reference positions of the center block area in the sensing area based on the second differential image;

detecting a plurality of peripheral reference positions of the peripheral block area in the sensing area based on the center reference positions; and generating the projection area information on a position of a projection area in the sensing area based on the center reference positions and the peripheral reference positions.

According to this feature, the image processing system and the like can appropriately detect the projection area by using the second differential image, even if a part of the projected image (peripheral section, for example) is positioned outside the projection target.

The image processing system and the projector of the embodiments of the invention may comprise:

image distortion correction section which corrects distortion of an image based on the projection target area information and the projection area information, and the projection section may project an image corrected by the image distortion correction section onto the projection target.

The program and the information storage medium of the embodiments of the invention may cause the computer to function as:

image distortion correction section which corrects distortion of an image based on the projection target area information and the projection area information, and the projection section may project an image corrected by the image distortion correction section onto the projection target.

The image processing method of the embodiment of the invention may comprise:

connecting distortion of an image based on the projection target area information and the projection area information; and projecting the corrected image onto the projection target.

This enables the image processing system and the like to appropriately correct distortion of an image even if the effect of external light occurs.

With the image processing system, the projector, the program and the information storage medium of the embodiments of the invention, the sensing section may generate the first sensing information by sensing the projection target at an automatic exposure, and may generate the second sensing information by sensing the projection target at an exposure determined by the automatic exposure for the first sensing information.

The image processing method of the embodiment of the invention may comprise:

generating the first sensing information by sensing the projection target at an automatic exposure, and generating the second sensing information by sensing the projection target at an exposure determined by the automatic exposure for the first sensing information.

According to this feature the image processing system and the like can remove the effect of external light at a higher speed and a low load by using the differential image of the sensing information sensed at the same exposure. The invention is described below with reference to the drawings taking the case of applying the invention to a projector including an image processing system as au example. Note that the embodiments described hereunder do not in any way limit the scope of the invention defined by the claims laid out herein. Note also that not all of the elements of these embodiments should be taken as essential requirements to the means of the invention.

Description of Entire System

FIG. 1 is a schematic diagram showing an image projection state according to an example of this embodiment.

A projector 20 projects an image onto a screen 10 which is one type of projection target As a result, a projected image 12 is displayed on the screen 10. This embodiment illustrates an example in which spot light 82 due to external light 80 (sunlight entering through an opening in a window shade, for example) is displayed on a part of the screen 10, and the peripheral section of the projected image 12 is displayed outside the screen 10, as shown in FIG. 1.

The projector 20 includes a sensor 60 which is a sensing section. The sensor 60 generates sensing information by sensing the screen 10, on which the projected image 12 is displayed, through a sensing plane. The projector 20 determines the positional relationship between the screen 10 and the projected image 12 and the shape of the projected image 12 based on the sensing information, and adjusts distortion and the display position of the projected image 12.

The projector 20 accurately generates positional information of the projection target area (area corresponding to the screen 10) and the projection area (area corresponding to the projected image 12) in the sensing area of the sensor 60 in a shorter period of time by performing image processing differing from conventional image processing.

The projector 20 more accurately detects the projection target area and the like by removing the effect of the external light 80 included in the sensed image.

Functional blocks of the projector 20 for implementing such functions are described below.

Figure 2:
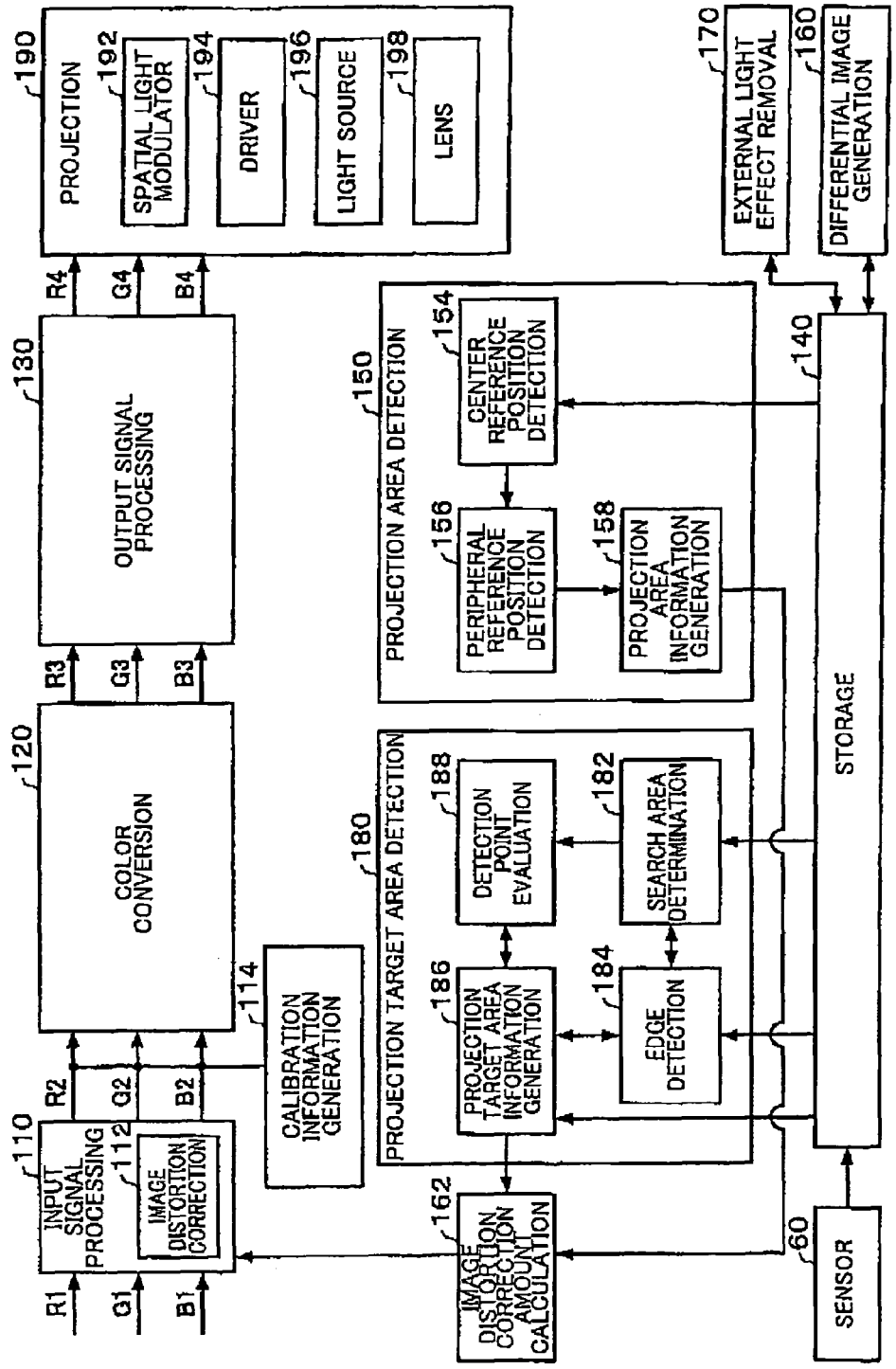
FIG. 2 is a functional block diagram of a projector according to an embodiment of the invention.

FIG. 2 is a functional block diagram of the projector 20 according to an example of this embodiment.

The projector 20 is configured to include an input signal processing section 110 which converts analog RGB signals (R1, G1, B1) input from a personal computer (PC) or the like into digital RGB signals (R2, G2, B2), a color conversion section 120 which converts the digital RGB signals (R2, G2, B2) into digital RGB signals (R3, G3, B3) in order to correct the color and brightness of an image, an output signal processing section 130 which converts the digital RGB signals (R3, G3, B3) into analog RGB signals (R4, G4, B4), and a projection section 190 which projects an image based on the analog RGB signals.

The projection section 190 is configured to include a spatial light modulator 192, a driver section 194 which drives the spatial light modulator 192, a light source 196, and a lens 198. The driver section 194 drives the spatial light modulator 192 based on the image signals from the output signal processing section 130. The projection section 190 projects light from the light source 196 through the spatial light modulator 192 and the lens 198.

The projector 20 is configured to include a calibration information generation section 114 which generates calibration information for displaying first, second, and third calibration images, the sensor 60 which generates sensing information of the calibration image, and a storage section 140 which temporarily stores the sensing information from the sensor 60 and the like.

The projector 20 is configured to include a differential image generation section 160 which generates a first differential image which is the difference between first and second sensed images and a second differential image which is the difference between first and third sensed images, and an external light effect removal section 170 which performs processing of removing the effect of external light.

The projector 20 is configured to include a projection area detection section 150 which detects the position of the projection area on the sensing plane (sensing area) of the sensor 60. The projection area detection section 150 is configured to include a center reference position detection section 154 which detects a plurality of center reference positions of a center block area included in the differential image, a peripheral reference position detection section 156 which detects a plurality of peripheral reference positions of peripheral block areas included in the differential image, and a projection area information generation section 158 which generates projection area information which indicates the position of the projection area based on each reference position.

The projector 20 includes a projection target area detection section 180 which generates projection target area information on the position of the projection target area corresponding to the screen 10 in the sensing area of the sensor 60. The projection target area detection section 180 is configured to include a search area determination section 182, an edge detection section 184, a detection point evaluation section 188 which evaluates edge detection points, and a projection target area information generation section 186 which generates provisional detection information by provisionally detecting the projection target area and generates the projection target area information.

The projector 20 includes image distortion correction section which corrects distortion of the projected image 12. In more detail, the projector 20 includes, as the image distortion correction section, an image distortion correction amount calculation section 162 which calculates an image distortion correction amount based on the projection area information and the projection target area information, and an image distortion correction section 112 which corrects the image signals based on the image distortion correction amount.

As hardware for implementing the function of each section of the projector 20, the following hardware may be applied, for example.

Figure 3:
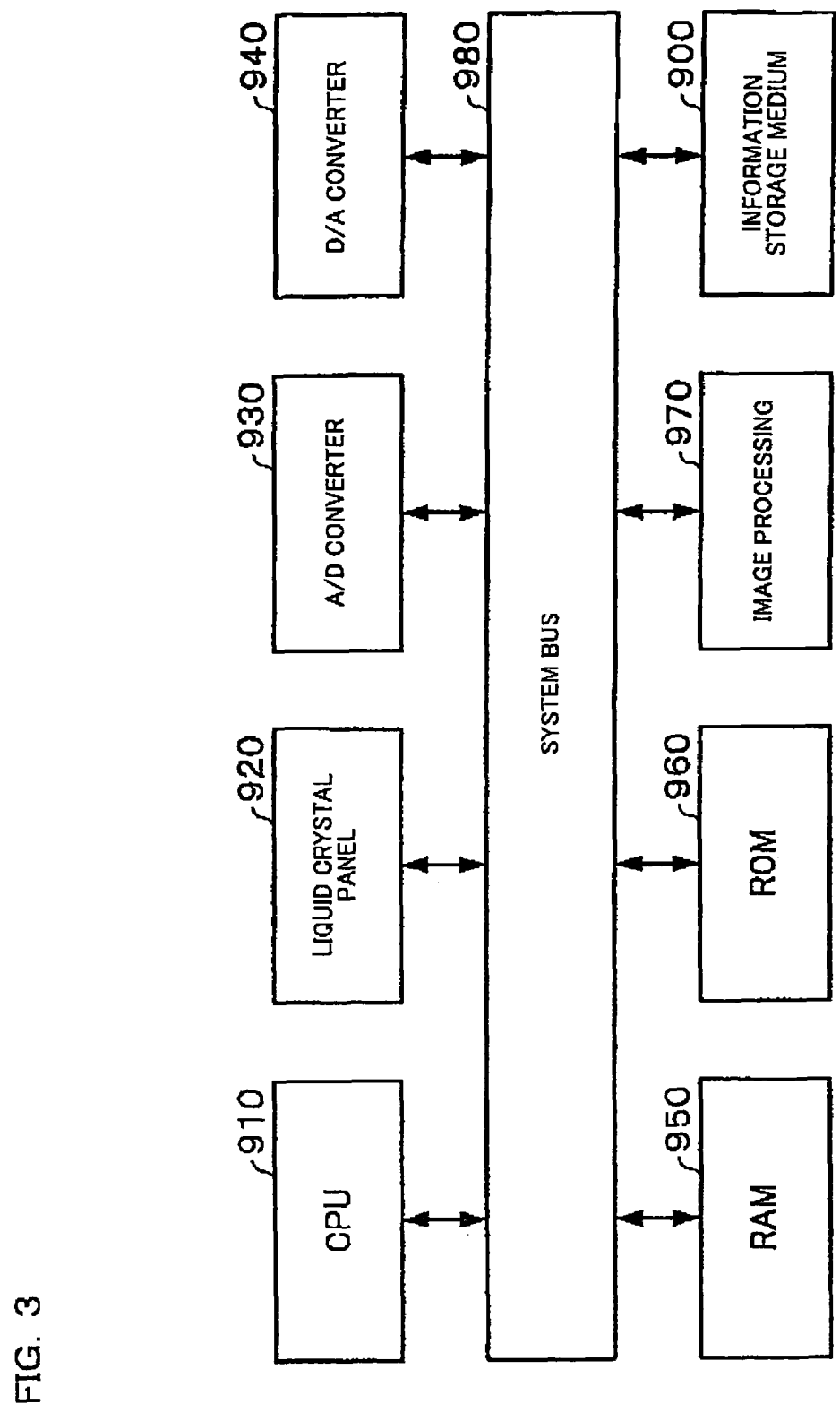
FIG. 3 is a hardware block diagram of a projector according to an embodiment of the invention.

FIG. 3 is a hardware block diagram of the projector 20 according to an example of this embodiment.

For example, the input signal processing section 110 may be implemented by using an A/D converter 930, an image processing circuit 970, or the like, the storage section 140 may be implemented by using a RAM 950 or the like, the projection area detection section 150, the differential image generation section 160, the external light effect removal section 170, and the projection target area detection section 180 may be implemented by using the image processing circuit 970 or the like, the image distortion correction amount calculation section 162 may be implemented by using a CPU 910 or the like, the calibration information generation section 114 may be implemented by using the image processing circuit 970, the RAM 950, or the like, the output signal processing section 130 may be implemented by using a D/A converter 940 or the like, the spatial light modulator 192 may be implemented by using a liquid crystal panel 920 or the like, and the driver section 194 may be implemented by using a ROM 960 which stores a liquid crystal light valve driver which drives the liquid crystal panel 920 or the like.

These sections can exchange information through a system bus 980.

These sections may be implemented by hardware such as a circuit, or may be implemented by software such as a driver.

The function of the projection target area information generation section 186 or the like may be implemented by a computer by causing the computer to read a program from an information storage medium 900 which stores a program for causing the computer to function as the projection target area information generation section 186 or the like.

As the information storage medium 900; a CD-ROM, DVD-ROM, ROM, RAM, HDD, or the like may be applied. The program reading method may be either a contact method or a noncontact method.

The above-described functions may be implemented by downloading a program for implementing the above-described functions or the like from a host device or the like through a transmission line instead of using the information storage medium 900.

Image processing using these sections is described below.

Figure 4:
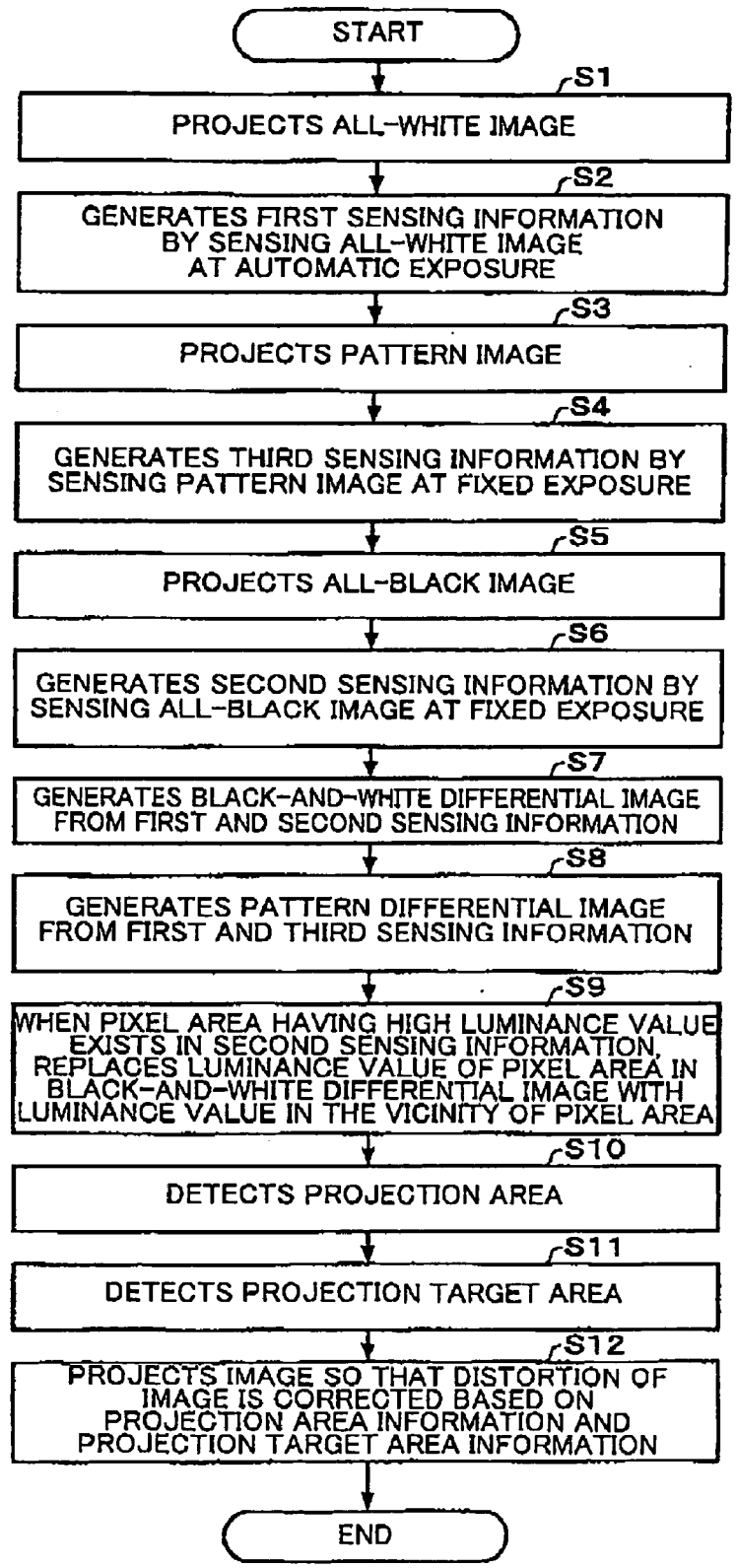
FIG. 4 is a flowchart showing a flow of image processing according to an embodiment of the invention.
Figure 5A:
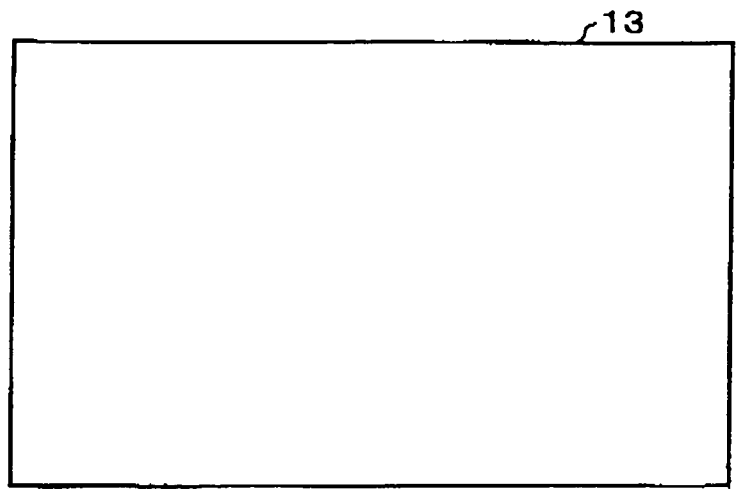
FIG. 5A is a schematic diagram of a first calibration image according to an embodiment of the invention.
Figure 5B:
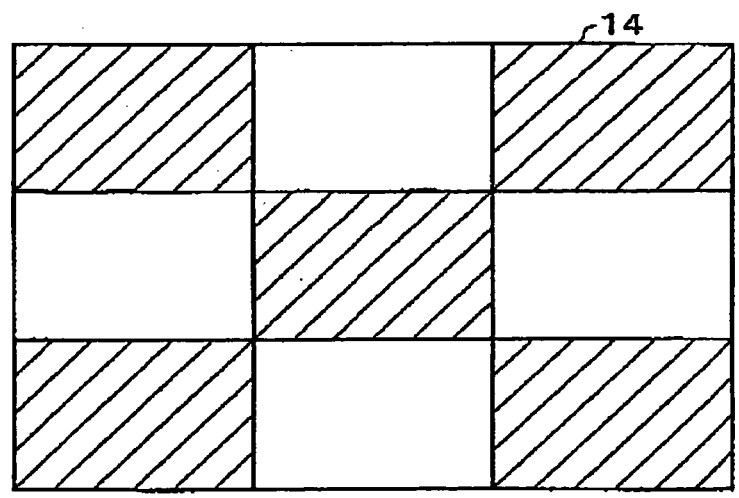
FIG. 5B is a schematic diagram of a third calibration image according to an embodiment of the invention.

FIG. 4 is a flowchart showing a flow of image processing according to an example of this embodiment FIG. 5A is a schematic diagram of the first calibration image according to an embodiment of the invention, and FIG. 5B is a schematic diagram of the third calibration image according to this embodiment.

The user installs the projector 20 facing the screen 10, and supplies power to the projector 20.

The projector 20 projects an all-white image (entire image is white) 13 shown in FIG. 5A as the first calibration image (step S1). In more detail, the calibration information generation section 114 generates calibration information (RGB signals, for example) for the all-white image 13, and the projection section 190 projects the all-white image 13 based on the calibration information.

The sensor 60 generates first sensing information by sensing the all-white image 13 on the screen 10 at an automatic exposure setting (step S2). The storage section 140 stores the first sensing information.

The projector 20 projects a pattern image 14 shown in FIG. 5B as the third calibration image (step S3). The pattern image 14 is a pattern image in a checkered pattern in which, when the entire image is equally divided into nine blocks, the center block area and four peripheral block areas at the four corners are black and the remaining block areas are white.

The user confirms whether or not the center block area is positioned inside the frame of the screen 10. When the center block area is not positioned inside the frame of the screen 10, the user adjusts the position of the projector 20 or the like so that the center block area is positioned inside the frame of the screen 10, and restarts the projector 20 to allow the projector 20 to perform the processing in the steps S1 to S3 again.

The sensor 60 generates third sensing information by sensing the pattern image 14 on the screen 10 in a state in which the center block area is positioned inside the frame of the screen 10 at the exposure when sensing the all-white image 13 (step S4). The storage section 140 stores the third sensing information.

The projector 20 projects an all-black image (entire image is black) as the second calibration image (step S5).

The sensor 60 generates second sensing information by sensing the all-black image on the screen 10 at the exposure when sensing the all-white image 13 (step S6). The storage section 140 stores the second sensing information.

The differential image generation section 160 generates a black-and-white differential image which is the first differential image between the first sensed image indicated by the first sensing information and the second sensed image indicated by the second sensing information (step S7). The storage section 140 stores the black-and-white differential image.

The differential image generation section 160 generates a pattern differential image which is the second differential image between the first sensed image and the third sensed image indicated by the third sensing information (step S8). The storage section 140 stores the pattern differential image.

The external light effect removal section 170 judges whether or not a pixel area having a high luminance value (brightness index value equal to or greater than a predetermined value (200, for example)) exists in the second sensing information, and, when the pixel area exists, performs processing of replacing the luminance value (50, for example) of the pixel area in the black-and-white differential image with the luminance value (30, for example) in the vicinity of the pixel area in the black-and-white differential image (step S9).

The effect of the external light 80 in the black-and-white differential image is removed by this processing.

The projection area detection section 150 detects the projection area in the sensing area based on the pattern differential image (step S10). In more detail, the projection area detection section 150 detects a plurality (four in this embodiment) of center reference positions of the center block area included in the pattern differential image and a plurality (eight in this embodiment) of peripheral reference positions of the peripheral block areas included in the patter differential image.

Figure 6:
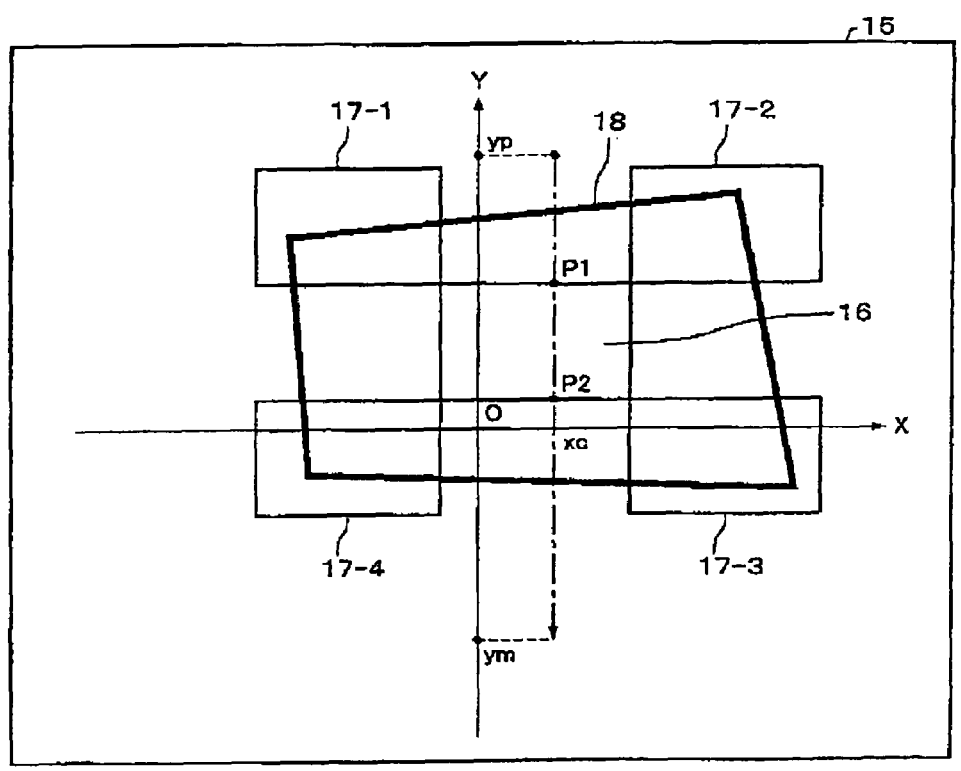
FIG. 6 is a schematic diagram showing a first-stage search method when detecting center reference positions according to an embodiment of the invention
Figure 7:
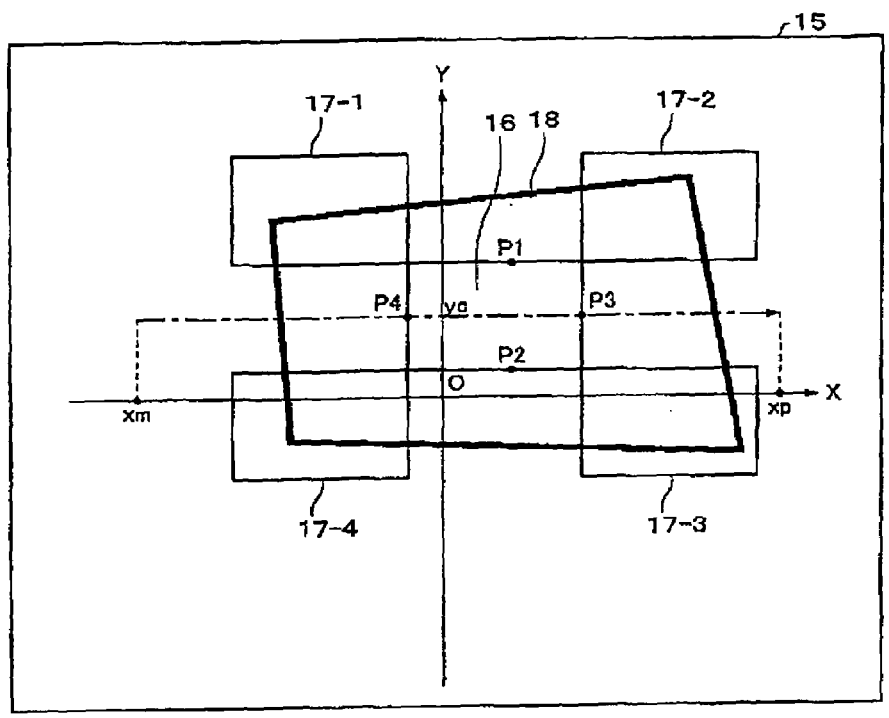
FIG. 7 is a schematic diagram showing a second-stage search method when detecting center reference positions according to an embodiment of the invention.

FIG. 6 is a schematic diagram showing a first-stage search method when detecting the center reference positions according to an example of this embodiment FIG. 7 is a schematic diagram showing a second-stage search method when detecting the center reference positions according to an example of this embodiment.

The center reference position detection section 154 detects four center reference positions of the pattern image in order to detect the position of the projection area (area corresponding to the projected image 12) in a sensing area 15 corresponding to the sensing plane. A projection target area 18 is provided in each drawing so that the description is readily understood. However, a part of the projection target area 18 or peripheral block areas 17-1 to 17-4 outside the projection target area 18 may not be included in the actual differential image.

In more detail, the center reference position detection section 154 determines points P1 and P2 at which the differential value changes by searching for the differential value in the differential image at the vertical position x=xc at which the center block area 16 is expected to be positioned from y=yp to y=ym in pixel units, as shown in FIG. 6. For example, suppose that P1 is (xc, y1) and P2 is (xc, y2).

The value of the search reference position such as xc, yp, or ym may be determined by the angle of view and the position of the lens 198 and the sensor 60, or may be determined by experiments, or may be determined corresponding to the sensing result This also applies to other search reference positions described later.

As shown in FIG. 7, the center reference position detection section 154 determines points P4 and P3 at which the differential value changes by searching for the differential value from x=xm to x=xp in pixel units at the horizontal position y=yc based on the points P1 and P2. yc equals (y1+y2)/2, for example.

The center reference position detection section 154 outputs center reference positional information which indicates the four center reference positions P1(xc, y1), P2(xc, y2), P3(x1, yc), and P4(x2, yc) of the center block area 16 to the peripheral reference position detection section 156.

The peripheral reference position detection section 156 detects eight peripheral reference positions of the pattern image based on the center reference positional information.

Figure 8:
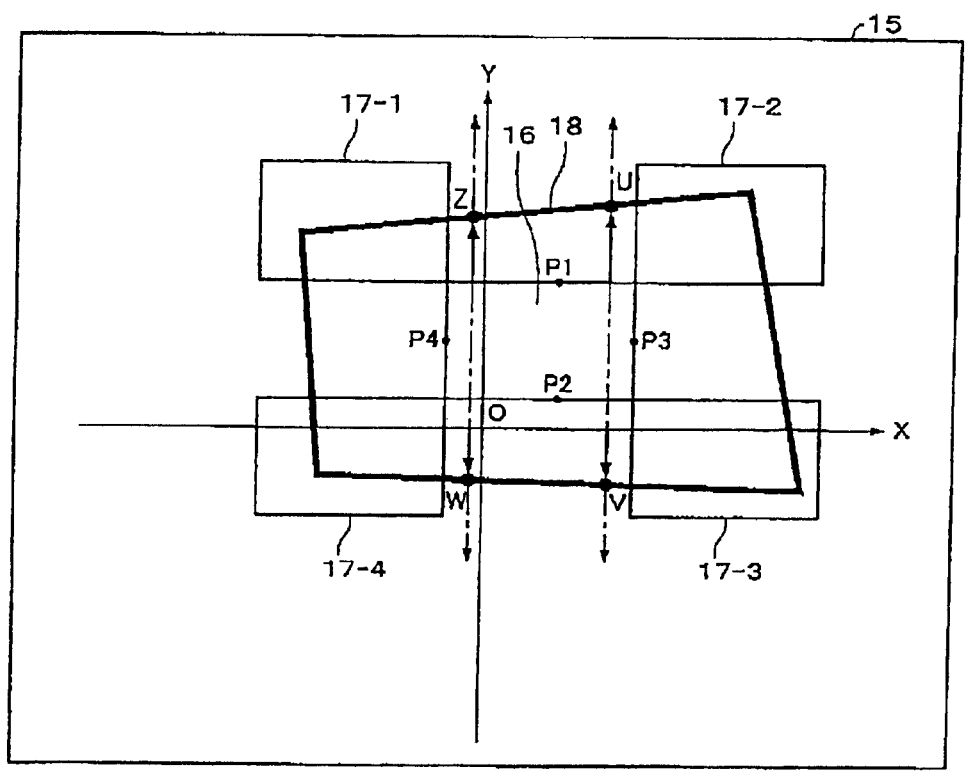
FIG. 8 is a schematic diagram showing a first-stage search method when detecting peripheral reference positions according to an embodiment of the invention.
Figure 9:
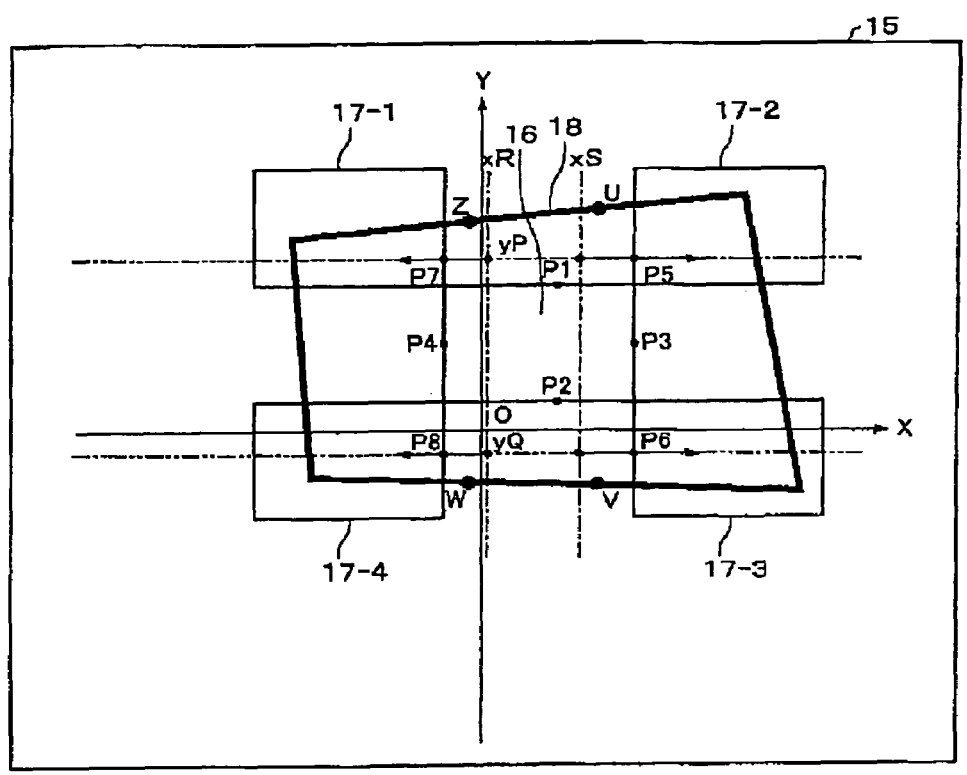
FIG. 9 is a schematic diagram showing a second-stage search method when detecting peripheral reference positions according to an embodiment of the invention.
Figure 10:
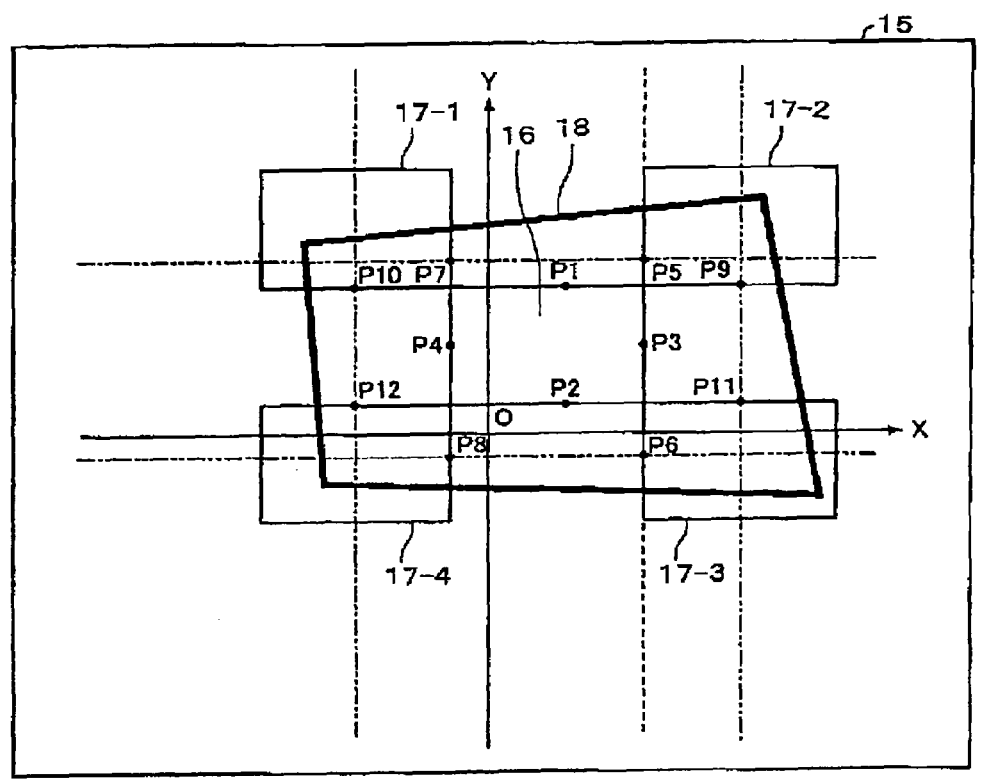
FIG. 10 is a schematic diagram showing a third-stage search method when detecting peripheral reference positions according to an embodiment of the invention.

FIG. 8 is a schematic diagram showing a first-stage search method when detecting the peripheral reference positions according to an example of this embodiment. FIG. 9 is a schematic diagram showing a second-stage search method when detecting the peripheral reference positions according to an example of this embodiment. FIG. 10 is a schematic diagram showing a third-stage search method when detecting the peripheral reference positions according to an example of this embodiment.

The edge detection section 184 of the projection target area detection section 180 performs edge detection in pixel units for the black-and-white differential image as the search target based on the center reference positions P1 to P4 of the center block area 16 outward from the Y-coordinate points y1 and y2 of the center reference positions P1 and P2 on additional search lines which exist inside the center block area 16 in the horizontal direction at a predetermined percentage from each of the center reference positions P3 and P4. As a result, four edge detection points Z, U, V, and W are detected.

As the method for the edge detection processing, a method of detecting the edge using a filter for a plurality of pixels, a method of detecting the luminance value as the edge in pixel units without using a filter, or the like may be employed.

The peripheral reference position detection section 156 calculates a Y-coordinate value yP which is the value obtained by adding a value at a predetermined percentage of the distance (differential value) between the smaller of the Y-coordinate value yZ of the point Z and the Y-coordinate value yU of the point U and the Y-coordinate value y1 of the center reference position P1 to the Y-coordinate value y1. The peripheral reference position detection section 156 calculates a Y-coordinate value yQ which is the value obtained by subtracting a value at a predetermined percentage of the distance between the larger of the Y-coordinate value yV of the point V and the Y-coordinate value yW of the point W and the Y-coordinate value y2 of the center reference position P2 from the Y-coordinate value y2.

The peripheral reference position detection section 156 calculates an X-coordinate value xR at a position inside the center block area 16 in the horizontal direction at a predetermined percentage from the X-coordinate value xZ of the point Z and the point W. The peripheral reference position detection section 156 calculates an X-coordinate value xS at a position inside the center block area 16 in the horizontal direction at a predetermined percentage from the X-coordinate value xU of the point U and the point V.

The peripheral reference position detection section 156 determines four points P5 to P8 existing on the side of each of the peripheral block areas 17-1 to 17-4 on the side of the center block area 16 by searching for the pattern differential image on the lines Y=yP and Y=yQ outward from the intersecting points of the four straight lines X=xR, X=xS, Y=yP, and Y=yQ (dash-dot-dot lines shown in FIG. 9) to detect pixels having an output. The peripheral reference position detection section 156 determines four points P9 to P12 existing on the horizontal side of each of the peripheral block areas 17-1 to 17-4 on the side of the center block area 16 by using the same method as described above.

The peripheral reference position detection section 156 outputs peripheral reference positional information which indicates the coordinates of these eight points and the center reference positional information to the projection area information generation section 158.

The projection area information generation section 158 detects the positions of four corners of the projection area by using approximation lines (may be approximation curves) based on the peripheral reference positional information and the center reference positional information.

Figure 11:
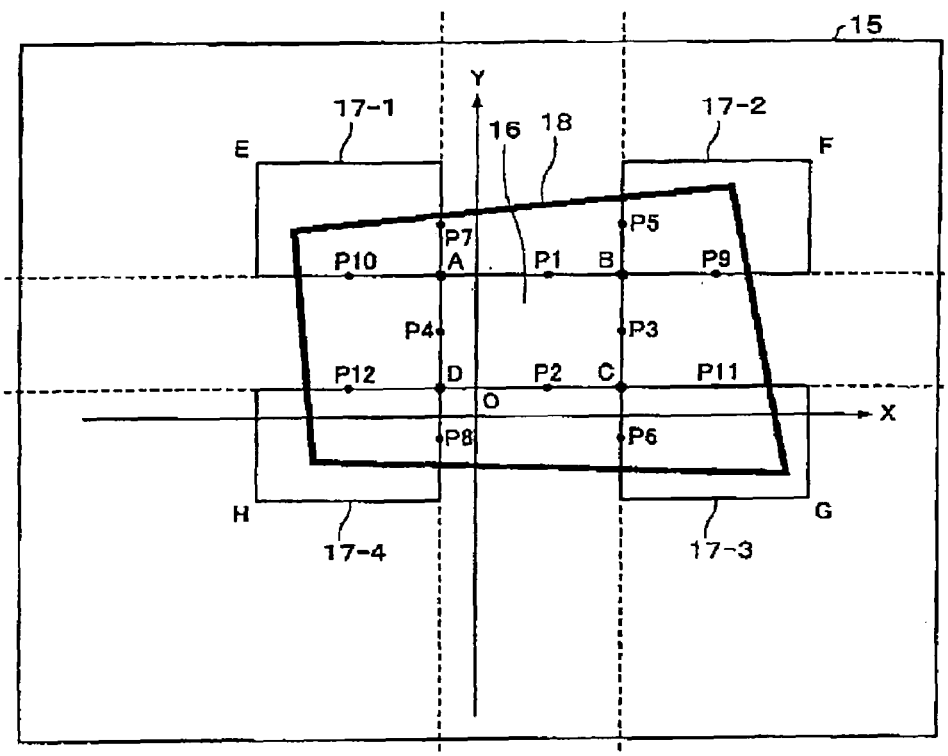
FIG. 11 is a schematic diagram showing a method for setting approximation lines according to an embodiment of the invention.

FIG. 11 is a schematic diagram showing a method for setting approximation lines according to an example of this embodiment.

The projection area information generation section 158 sets an approximation line indicated by the dashed line shown in FIG. 10 based on the coordinates of the points P5, P3, and P6. The projection area information generation section 158 sets four approximation lines indicated by the dashed lines as shown in FIG. 11 by using the same method as described above, and determines four intersecting points A(xA, yA) to D(xD, yD) of each approximation line as four corner points of the center block area 16.

Since the center block area 16 is the area corresponding to an image obtained by reducing the original projected image 12 by ⅕, four corner points E, F, G, and H of the projection area corresponding to the projected image 12 are expressed as follows. Specifically, E(xE, yE)=(2*xA−xC, 2*yA−yc), F(x, yF)=(2*xB−xD, 2*yB−yD), G(xG, yG)=(2*xC−xA, 2*yC−yA), and H(xH, yH)=(2*xD−xB, 2*yD−yB).

The projection area information generation section 158 outputs projection area information which indicates the four corner points E, F, G, and H of the projection area corresponding to the projected image 12 to the image distortion correction amount calculation section 162 by using the above-described method.

The projection target area detection section 180 detects the projection target area 18 in the sensing area 15 based on the black-and-white differential image (step S11). The position detection processing of the projection target area 18 is described below.

Figure 12:
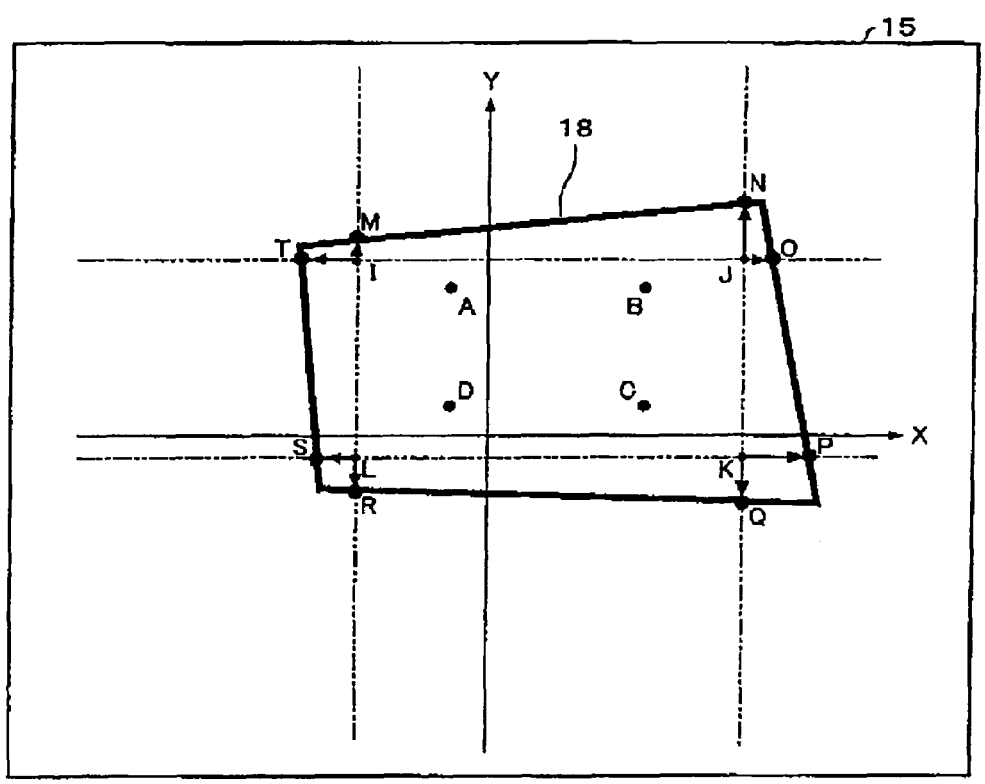
FIG. 12 is a schematic diagram showing a search method when detecting a projection target area according to an embodiment of the invention.

FIG. 12 is a schematic diagram showing a search method when detecting the projection target area according to an example of this embodiment.

In order to determine the edge detection target, the search area determination section 182 sets four additional search lines which pass outside the area ABCD to some extent based on the black-and-white differential image and the coordinate information of the four corners A, B, C, and D of the center block area 16. In more detail, the search area determination section 182 sets the additional search lines for the black-and-white differential image at positions p % a outside the coordinates of the four corners A, B, C, and D of the center block area 16 detected by the center reference position detection section 154.

For example, a first additional search line is y=round[max (yA,yB)+yA−yD) *p/100], a second additional search line is x=round[max(xB,xC)+(xB−xA)*p/100], a third additional search line is y=round[min(yC,yD)−(yA−yD)*p/100], and a fourth additional search line is x=round[min(xA,xD)−(xB−xA)*p/100]. The symbols max, min, and round respectively indicate a function which returns the maximum value of the arguments, a function which returns the minimum value of the arguments, and a function which returns an integer obtained by rounding off the argument to the nearest whole number.

As shown in FIG. 12, four intersecting points I, J, K, and L of the four additional search lines are determined by setting the four additional search lines as described above. Instead of setting the four additional search lines, the lines Y=yP and Y=yQ calculated by the peripheral reference position detection section and two straight lines in parallel to the Y axis (corresponding to Y=yP and Y=yQ) calculated when determining the points P9 to P12 may be set as four additional search lines, and the intersecting points of the four additional search lines may be used as I, J, K, and L.

The edge detection section 184 performs edge detection for the black-and-white differential image as the search target in pixel units on search lines on the additional search lines toward the outside of the area IJKL from each of the intersecting points I,J, K, and L. As a result eight edge detection points M, N, O, P, Q, R, S, and T are detected as shown in FIG. 12.

The edge detection section 184 performs edge detection in pixel units in each of the direction from the line segment TO toward the borderline of the projection target area 18, the direction from the line segment NQ toward the borderline of the projection target area 18, the direction from the line segment PS toward the borderline of the projection target area 18, and the direction from the line segment RM toward the borderline of the projection target area 18.

The following description is given taking the case of performing edge detection in the direction from the line segment TO toward the borderline of the projection target area 18 as an example. The edge detection section 184 performs edge detection from the line segment TO in parallel to the Y axis and in the positive direction, for example. The edge detection section 184 sets seven search lines for the line segment IJ, and sets two search lines for each of the line segments TI and JO. The area in which the seven search lines are set is called an inner search area, and each of the two areas in which the two search lines are set is called an outer search area.

The edge detection section 184 can detect 11 edge detection points at maximum (13 edge detection points at maximum including the points M and N) on the straight line MN by performing edge detection on the search lines in pixel units. The edge detection section 184 performs edge detection for the remaining line segment NQ, line segment PS, and line segment RM in the same manner as described above.

In the case where one point of each pair of the edge detection points MN, OP, QR, and ST cannot be detected in the sensing area 15, the edge detection section 184 determines that the borderline of the projection target area 18 does not exist in the outer search area for searching for the undetected point, and does not set the search line or perform edge detection in that area. In the case where both points of each pair of the edge detection points MN, OP, QR, and ST cannot be detected in the sensing area 15, the edge detection section 184 determines that the borderline of the projection target area 18 adjacent to the undetected line segment in parallel does not exist, and does not set the search line or perform edge detection in the inner search area and the outer search area for searching for the undetected line segment.

The edge detection section 184 can omit edge detection for the area in which the projection target area 18 exists with low possibility by performing the above processing, whereby the processing can be performed at higher speed.

The projection target area information generation section 186 preliminarily determines the projection target area 18 by setting linear approximation lines or linear approximation curves based on the edge detection points detected by the edge detection section 184.

The detection point evaluation section 188 evaluates each edge detection point by judging whether or not each edge detection point detected by the edge detection section 184 is separated from the linear approximation line or linear approximation curve set by the projection target are information generation section 186 at a value equal to or greater than a predetermined value.

The projection target area information generation section 186 detects the projection target area 18 with higher accuracy by using only the edge detection points which are not excluded from the processing target.

In more detail, the edge detection section 184 performs edge detection for peripheral pixels of the edge detection points which are not excluded from the processing target based on the black-and-white differential image. The edge detection section 184 outputs edge detection information to the projection target area information generation section 186.

The projection target area information generation section 186 determines the projection target area 18 by again setting linear approximation lines or linear approximation curves based on the edge detection information. The projection target area information generation section 186 generates the projection target area information which indicates the positions of four corners of the projection target area 18, and outputs the projection target area information to the image distortion correction amount calculation section 162.

The projector 20 projects an image so that distortion of the projected image 12 is corrected based on the projection area information and the projection target area information (step S12).

In more detail, the image distortion correction amount calculation section 162 determines the positional relationship and the shape of the screen 10 and the projected image 12 based on the projection area information from the projection area information generation section 158 and the projection target area information from the projection target area information generation section 186, and calculates the image distortion correction amount so that distortion of the projected image 12 is corrected and the projected image 12 has a desired aspect ratio (height/width ratio).

The image distortion correction section 112 corrects the image signals (R1, G1, B1) based on the image distortion correction amount. This enables the projector 20 to project an image without distortion while maintaining a desired aspect ratio.

The image distortion correction method is not limited to this method. For example, the projector 20 may detect a pixel having the greatest luminance value in the sensed image, and correct distortion of the image based on the position of the pixel.

As described above, according to this embodiment, the projector 20 can appropriately detect the projection target area 18 in the sensed image in a state in which the effect of the external light 80 which causes a strong contrast is removed by performing the external light effect removal processing.

According to this embodiment, the projector 20 can detect the projection target area 18 or the like with higher accuracy by detecting the projection target area 18 or the like by performing edge detection or the like for the differential image from which the external light effect is removed.

According to this embodiment, the projector 20 can accurately generate the positional information of the projection target area 18 in a shorter period of time by preliminarily detecting the projection target area 18 and detecting the vicinity of the borderline of the projection target area 18. This reduces the amount of calculation processing of the entire image processing system, whereby the projector 20 can perform high-speed image processing at a low load.

According to this embodiment, the projector 20 can generate the positional information of the projection target area 18 in a shorter period of time by performing edge detection in a state in which the edge detection target area is reduced.

The projector 20 can reduce the effect of noise or the like by performing the processing while excluding the edge detection point separated from the linear approximation line or the like, whereby the positional information of the projection target area 18 can be generated more accurately.

This enables the projector 20 to appropriately correct distortion of the projected image 12.

The projector 20 can more accurately determine the four corners of the projection area in comparison with the case of using a pattern image having features only at the center by using an image having features not only at the center but also on the periphery as in the pattern image 14 shown in FIG. 5B.

For example, when determining the points P1 and P2 shown in FIG. 6, the projector 20 can also determine points near the points P1 and P2 at which the luminance value changes. However, in the case of setting the approximation lines using the points located at small intervals, the approximation line is affected to a large extent by an error of one pixel at the point which makes up the approximation line in comparison with the case of setting the approximation line using the points located at large intervals.

In this embodiment, since the projector 20 can set the approximation lines using the points located at large intervals by using the reference points of the center block area 16 and the reference points of the peripheral block areas 17-1 to 17-4, the projector 20 can more accurately determine the four corners of the projection area.

This enables the projector 20 to accurately determine the position of the entire projection area while preventing the effect of shading of the projector 20 or the sensor 60.

Moreover, the projector 20 can appropriately detect the projection area by using the pattern image 14, even if the peripheral section of the projected image 12 is displayed outside the screen 10.

According to this embodiment, the projector 20 can more easily detect the position of the projection area at high speed by searching for only a necessary area of the differential image instead of searching for the entire differential image.

The projector 20 can generate the first sensing information at an exposure conforming to the application environment by generating the first sensing information by sensing the all-white image at the automatic exposure setting when projecting the calibration image. The projector 20 can generate the second and third sensing information at an exposure suitable for generating the differential image by generating the second and third sensing information at the exposure when sensing the all-white image.

In particular, the sensor 60 can sense the image by effectively utilizing the dynamic range of the sensor 60 by sensing the all-white image at the automatic exposure setting in comparison with the case of sensing the image at a fixed exposure, even when the screen 10 is affected by the external light 80, when the reflected projection light is too weak since the projection distance is too great or the reflectivity of the screen 10 is too low, and when the reflected projection light is too strong since the projection distance is too small or the reflectivity of the screen 10 is too high.

Modification

A preferred embodiment to which the invention is applied is described above. However, the application of the invention is not limited to the above-described embodiment.

In the above-described embodiment, in the case where a pixel area having a luminance value equal to or greater than a predetermined value exists in the first or second sensing information, the external light effect removal section 170 performs the processing of replacing the luminance value of the pixel area in the black-and-white differential image with the luminance value in the vicinity of the pixel area in the black-and-white differential image. As a modification, a special value (300, for example) may be set as the luminance value of the pixel area in the black-and-white differential image or the pattern differential image so that the edge detection processing is not performed.

When the edge detection section 184 has detected the special value, the edge detection section 184 performs processing of invalidating the edge detection result of the area. When the center reference position detection section 154 or the peripheral reference position detection section 156 has detected the special value, the center reference position detection section 154 or the peripheral reference position detection section 156 performs processing of excluding the area from the center reference position or the peripheral reference position.

When a pixel area having a luminance value equal to or greater than a predetermined value (minimum value assumed to be caused by the external light effect, for example) is included in the detection target area, the projection target area detection section 180 or the projection area detection section 150 may perform the detection processing while ignoring, invalidating or removing the pixel area.

The projector 20 can also remove the external light effect by such processing.

In the above-described embodiment, the sensor 60 generates the second sensing information by using the all-black image. As a modification, the sensor 60 may generate the second sensing information by sensing the screen 10 when an image is not projected.

The external light effect removal section 170 may perform the external light effect removal processing for the pattern differential image as the processing target.

The differential image generation section 160 may use the differential image between the all-black image and the pattern image 14 as the pattern differential image.

The sensor 60 may generate the first or second sensing information by sensing the screen 10 in a state in which the projection section 190 projects planar light onto the screen 10 from the light source 196 in a state in which the image signal is not input. Specifically, the projector 20 does not necessarily project the all-white image 13 or the all-black image.

The positional relationship between the projected image 12 and the screen 10 is not limited to the example shown in FIG. 1. For example, the entire outer frame of the projected image 12 may be located outside or inside of the outer frame of the screen 10.

In addition to correction of distortion of an image, the projector 20 may adjust the position of the projected image 12 using the projection area information and the projection target area information, detect the indication position in the projected image 12 using a laser pointer or the like, or correct the color non-uniformity of the projected image 12 using the projection target area information, for example.

The search procedure is arbitrary. For example, the projector 20 may detect the center reference positions or the peripheral reference positions by searching for the differential image in the horizontal direction, and search for the differential image in the vertical direction based on the center reference positions or the peripheral reference positions.

The projector 20 may detect the projection area after detecting the projection target area 18.

The pattern image 14 is not limited to that in the above-described embodiment. For example, the pattern differential image may be an image having a pattern similar to that of the pattern image 14. Specifically, the first calibration image may be an image having the center block area 16, and the third calibration image may be an image having the peripheral block areas 17-1 to 17-4.

The shape of the center block area 16 and the peripheral block areas 17-1 to 17-4 is not limited to quadrilateral. For example, a shape other than quadrilateral such as a circle may be employed. The shape of the entire calibration image and the shape of the center block area 16 may not be similar. It suffices that the calibration image and the center block area 16 have a shape which allows the correspondence between the shape of the calibration image and the shape of the center block area 16 to be identified. The number of the peripheral block areas 17-1 to 17-4 is also arbitrary.

The order of projection and sensing of the all-white image 13, the all-black image, and the pattern image 14 is arbitrary. For example, the projector 20 may perform the processing in the steps S1 to S6 after projecting the pattern image 14 and allowing the user to confirm whether or not the center block area is positioned inside the screen 10, or may project and sense the pattern image 14 after projecting and sensing the all-black image.

The invention is also effective even when projecting an image onto a projection target other than the screen 10, such as a blackboard or a whiteboard.

The above-described embodiment illustrates an example in which the image processing system is provided to the projector 20. However, the image processing system may be provided to an image display device other than the projector 20, such as a cathode ray tube (CRT). As the projector 20, a projector using a digital micromirror device (DMD) or the like may be used in addition to the liquid crystal projector. DMD is a trademark of Texas Instruments, Inc. (USA).

The function of the projector 20 may be implemented by only a projector, or may be distributed over a plurality of processing devices (distribution processing by projector and PC, for example).

In the above-described embodiment, the sensor 60 is included in the projector 20. However, the sensor 60 may be configured as a device independent of the projector 20.

Although only some embodiments of the invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An image processing system, comprising:
   projection section which projects a first calibration image or planar light and a second calibration image or planar light onto a projection target;
   sensing section which generates first sensing information by sensing the projection target onto which the first calibration image or the planar light is projected, and generating second sensing information by sensing the projection target onto which the second calibration image or the planar light is projected;
   differential image generation section which generates a first differential image which is a difference between a first sensed image indicated by the first sensing information and a second sensed image indicated by the second sensing information;
   external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and
   projection target area detection section which generates projection target area information on a position of a projection target area corresponding to the projection target in a sensing area of the sensing section by performing the edge detection processing based on the first differential image subjected to the processing by the external light effect removal section.

2. An image processing system, comprising:
   projection section which projects a first calibration image or planar light onto a projection target;
   sensing section which generates first sensing information by sensing the projection target onto which the first calibration image or the planar light is projected, and generating second sensing information by sensing the projection target onto which an image or light is not projected;
   differential image generation section which generates a first differential image which is a difference between a first sensed image indicated by the first sensing information and a second sensed image indicated by the second sensing information;
   external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and
   projection target area detection section which generates projection target area information on a position of a projection target area corresponding to the projection target in a sensing area of the sensing section by performing the edge detection processing based on the first differential image subjected to the processing by the external light effect removal section.

3. The image processing system as defined in claim 1, comprising:
   projection area detection section which generates projection area information on a position of a projection area in the sensing area of the sensing section,
   wherein the projection section projects a third calibration image onto the projection target,
   wherein the sensing section senses the projection target onto which the third calibration image is projected and generates third sensing information,
   wherein the differential image generation section generates a second differential image which is a difference between the first sensed image and a third sensed image indicated by the third sensing information,
   wherein the second differential image includes a center block area located in a center portion of the differential image, a peripheral block area located in a periphery of the center block area, and a background area which is an area other than the center block area and the peripheral block area,
   wherein each pixel in the center block area and the peripheral block area has a brightness index value differing from a brightness index value of each pixel in the background area, and
   wherein the projection area detection section includes:
   center reference position detection section which detects a plurality of center reference positions of the center block area in the sensing area of the sensing section based on the second differential image;
   peripheral reference position detection section which detects a plurality of peripheral reference positions of the peripheral block area in the sensing area based on the center reference positions; and projection area information generation section which generates the projection area information based on the center reference positions and the peripheral reference positions.

4. The image processing system as defined in claim 3, comprising:
image distortion correction section which corrects distortion of an image based on the projection target area information and the projection area information,
wherein the projection section projects an image corrected by the image distortion correction section onto the projection target.

5. The image processing system as defined in claim 1,
wherein the sensing section generates the first sensing information by sensing the projection target at an automatic exposure, and generates the second sensing information by sensing the projection target at an exposure determined by the automatic exposure for the first sensing information.

6. A projector comprising:
projection section which projects a fist calibration image or planar light and a second calibration image or planar light onto a projection target;
sensing section which generates first sensing information by sensing the projection target onto which the first calibration image or the planar light is projected, and generating second sensing information by sensing the projection target onto which the second calibration image or the planar light is projected,
differential image generation section which generates a first differential image which is a difference between a first sensed image indicated by the first sensing information and a second sensed image indicated by the second sensing information;
external light effect removal section which performs, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and
projection target area detection section which generates projection target area information on a position of a projection target area corresponding to the projection target in a sensing area of the sensing section by performing the edge detection processing based on the first differential image subjected to the processing by the external light effect removal section.

7. A program contained on a computer-readable information storage medium causing a computer to function as:
projection section which projects a first calibration image or planar light and a second calibration image or planar light onto a projection target;
sensing section which generates first sensing information by sensing the projection target onto which the first calibration image or the planar light is projected, and generating second sensing information by sensing the projection target onto which the second calibration image or the planar light is projected;
differential image generation section which generates a first differential image which is a difference between a first sensed image indicated by the first sensing information and a second sensed image indicated by the second sensing information;
external light effect removal section which performs, when a pixel area having a brightness index value equal to or rater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and
projection target area detection section which generates projection target area information on a position of a projection target area corresponding to the projection target in a sensing area of the sensing section by performing the edge detection processing based on the first differential image subjected to the processing by the external light effect removal section.

8. An image processing method comprising:
projecting a first calibration image or planar light onto a projection target;
generating first sensing information by sensing the projection target onto which the first calibration image or the planar light is projected;
projecting a second calibration image or the planar light onto the projection target;
generating second sensing information by sensing the projection target onto which the second calibration image or the planar light is projected;
generating a first differential image which is a difference between a first sensed image indicated by the first sensing information and a second sensed image indicated by the second sensing information;
performing, when a pixel area having a brightness index value equal to or greater than a predetermined value exists in the first or second sensing information, processing of replacing the brightness index value of the pixel area in the first differential image with a brightness index value in a vicinity of the pixel area in the first differential image, or processing of setting a special value as the brightness index value of the pixel area in the first differential image so that edge detection processing is not performed; and
generating projection target area information on a position of a projection target area corresponding to the projection target in a sensing area by performing the edge detection processing based on the first differential image subjected to the processing.

9. The image processing method as defined in claim 8, comprising:
projecting a third calibration image onto the projection target;
sensing the projection target onto which the third calibration image is projected and generating third sensing information; and
generating a second differential image which is a difference between the first sensed image and a third sensed image indicated by the third sensing information,
wherein the second differential image includes a center block area located in a center portion of the differential image, a peripheral block area located in a periphery of the center block area, and a background area which is an area other than the center block area and the peripheral block area, wherein each pixel in the center block area and the peripheral block area has a brightness index value differing from a brightness index value of each pixel in the background area, and wherein the method further includes:

detecting a plurality of center reference positions of the center block area in the sensing area based on the second differential image;

detecting a plurality of peripheral reference positions of the peripheral block area in the sensing area based on the center reference positions; and generating the projection area information on a position of a projection area in the sensing area based on the center reference positions and the peripheral reference positions.

10. The image processing method as defined in claim 9, comprising:

correcting distortion of an image based on the projection target area information and the projection area information; and projecting the corrected image onto the projection target.

11. The image processing method as defined in claim 8, comprising:

generating the first sensing information by sensing the projection target at an automatic exposure, and generating the second sensing information by sensing the projection target at an exposure determined by the automatic exposure for the first sensing information.

* * * * *